Patented June 18, 1935

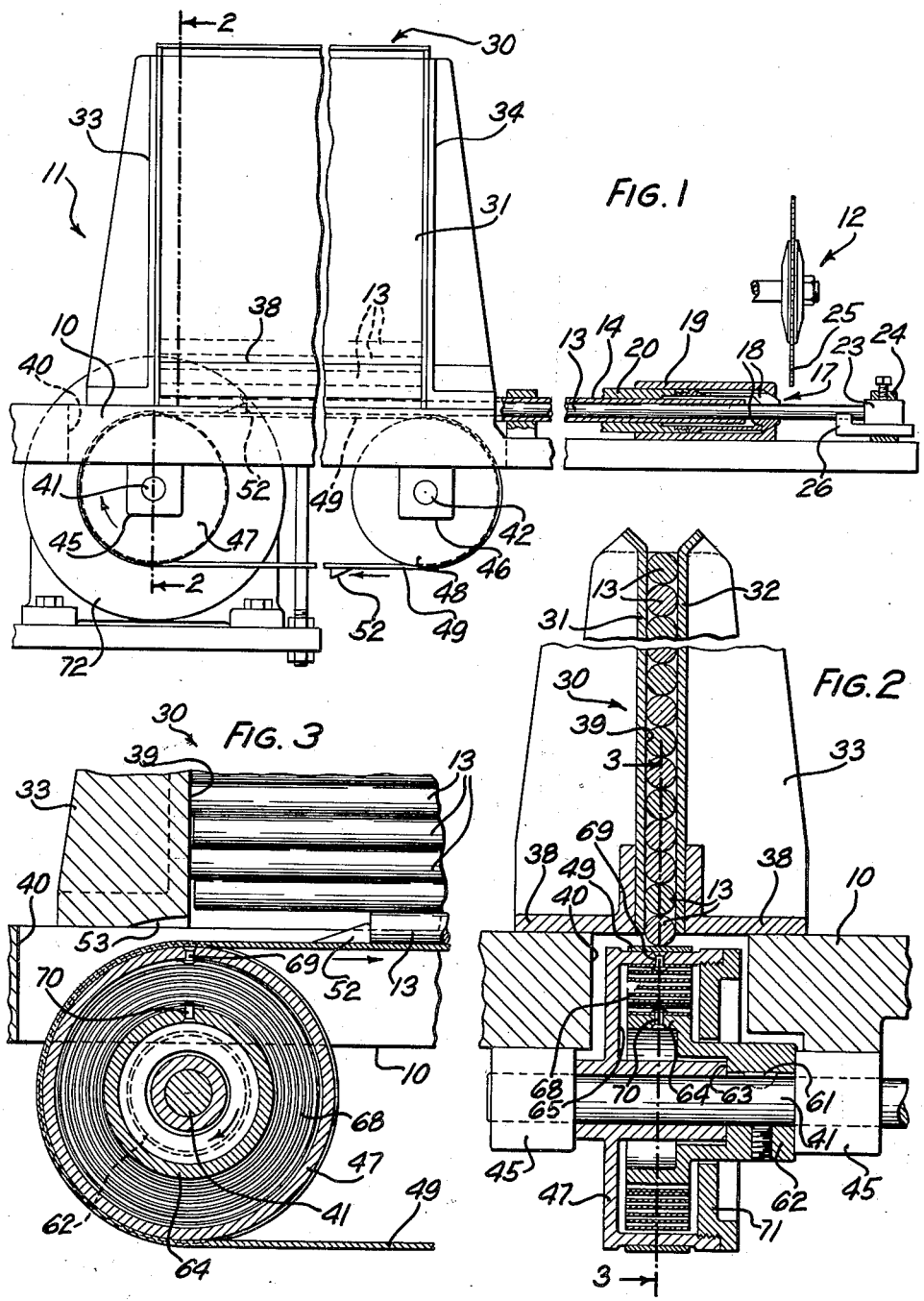

2,005,589

UNITED STATES PATENT OFFICE 2,005,589

ARTICLE CONVEYING MECHANISM

Clarence E. McCoy, Western Springs, Ill., assignor to Western Electric Company, Incorporated, New York, N. Y., a corporation of New York Application April 14, 1933, Serial No. 666,071

11 Claims. (Cl. 164—61)

This invention relates to article conveying mechanisms, and more particularly to a mechanism for feeding or transferring articles.

An object of this invention is to provide a simple and efficient mechanism for transferring articles from one position to another.

In accordance with one embodiment of this invention, as applied to an automatic cutting off machine, there is provided a mechanism for intermittently feeding or transferring successive lengths of bar stock in end to end abutting relation from a magazine to a positioning stop member of the cutting off machine as needed. The feeding mechanism comprises an endless belt arranged for movement underneath an open bottom magazine and adapted to receive and advance successively the lowermost bar in the magazine toward and against the positioning stop member, the belt extending around a pair of pulleys, one of which is a driving pulley connected through a spiral clock spring to a stall torque electric motor. In operation the stall torque motor tends to continually wind the spring to a predetermined tension, the resistance being obtained by the belt which advances the bars, continually urging the bar or bars endwise into position against the stop member.

Other features and advantages of the invention will become apparent from the following detailed description taken in connection with the accompanying drawing, wherein Fig. 1 is a fragmentary front elevational view of a stock feeding mechanism embodying the features of the invention shown applied to a cutting off machine which is shown fragmentarily and partly in section;

Fig. 2 is an enlarged fragmentary vertical detail section taken on the line 2—2 of Fig. 1, and Fig. 3 is a fragmentary vertical detail section taken on the line 3—3 of Fig. 2.

Referring now to the drawing in detail and particularly to Fig. 1, the reference numeral 10 indicates a portion of a supporting frame upon which is mounted the improved feeding mechanism indicated in general at 11. The feeding mechanism 11 has been shown applied, for example, to an automatic machine, indicated in general at 12, adapted to cut bar or other stock into sections of predetermined lengths, the stock in the present instance comprising a vulcanized rubber rod 13 of circular cross section. Inasmuch as the present invention is not concerned with the cutting off machine 12 proper, only such elements thereof which are necessary to illustrate one application of the invention thereto are illustrated. A stationary tube or stock guiding spindle 14 of the cutting off machine 12 is surrounded at its right end by a chuck 17 provided with integral spring action contractile stock grasping jaws 18 provided with conically arranged surfaces for engaging the surface of a conical bore of a stationary bearing sleeve 19 fixed to the frame 10. The left end of the chuck 17 is secured to a sleeve 20 reciprocably mounted on the spindle 14 and within the bore of the bearing sleeve 19. It will be apparent that upon a reciprocatory movement of the sleeve 20 toward the right to the position shown in the drawing, due to the cooperating outer conical surfaces on the chuck jaws 18 and the inner conical surface of the bearing sleeve 19, the circular rod 13 advanced into position between the jaws will be grasped thereby and upon a reverse movement of the sleeve 20 the rod will be released therefrom due to the spring action of the jaws 18. Adjacent the outer end of the chuck 17 is a positioning stop 23 which is longitudinally adjustable in a bracket 24 to vary the distance between the point at which the bar stock is severed, by a continuously revolving circular saw 25, and the end of the stop 23 to provide for stock sections of different lengths. Also adjustably carried in the bracket 24 is a stock rest 26 for supporting the stock during the cutting off operation. Although not shown in the drawing it will be readily understood that the bracket 24 may be longitudinally adjustable on its support (not shown) to and from the chuck 17 to provide for severed lengths of stock which the range of adjustment of the stop 23 will not permit. In the operation of the cutting off machine 12 the revolving saw 25 is moved to and from the rod 13 to perform a severing operation and then is retracted from the rod.

It is to be understood that the reciprocable sleeve 20 for closing and opening the jaws 18 of the clutch 17 and the movement of the saw 25 to and from the rod 13 to perform the cutting operation are operated in proper sequence by suitable mechanism (not shown). This mechanism is not shown since it forms no part of the present invention and is not necessary to a clear understanding thereof.

In accordance with the features of the present invention, mechanism is provided for successively advancing rods 13 from a supply thereof to the positioning stop 23 of the cutting off machine 12. Secured to the upper surface of the frame 10 at the left end of the tube guiding spindle 14 is a magazine 30 of any suitable construction adapted to accommodate a supply of rods arranged horizontally in a vertical column, as best shown in Fig. 2. The magazine 30 comprises a pair of spaced vertical side plates 31 and 32, vertical end members 33 and 34 and horizontal angle members 35, all secured together and cooperating to form a chamber 39 for accommodating the particular rod 13 to be fed to the machine 12. The frame 10 is provided with a longitudinal opening 40 arranged below the magazine 30 which has an open bottom for the passage of the rods 13 therefrom.

Carried on parallel shafts 41 and 42 journaled in bearing blocks 45 and 46, respectively, secured to the underside of the frame 10 are driving and idler pulleys 47 and 48 and passing therearound is an endless metallic belt 49. The shafts 41 and 42 are spaced on a center to center distance slightly greater than the longest rod 13 which can be accommodated in the chamber 39 of the magazine 30. Fixed to the belt 49 are two outwardly extending lugs 52 which are of a width slightly less than the diameter of the rods 13 so that they may in their movement with the belt 49 enter the space between the side plates 31 and 32 of the magazine 30 and engage the rear end of the lowermost rod 13 resting on the belt 49. Only one rod at a time will be engaged by the lugs for transfer from the magazine 30. A slot 53 (Fig. 3) is formed in the magazine end member 33 for the passage of the lugs 52 as they enter the magazine chamber 39 and the opposite end member 34 is provided with a slot (not shown) which serves for the passage of the lugs as they pass from the chamber, as well as for the passage of the rod 13 from the chamber into the tube or rod guiding spindle 14 of the machine 12 with which it registers.

The shaft 41 has keyed thereto, as indicated at 61, Fig. 2, a shouldered annular member 62 provided with an inner annular shoulder 63 which abuts the right end of the hub portion of the driving pulley 47, the outer ends of the member 62 and pulley being freely fitted between the bearing blocks 45 with the pulley freely journaled on the shaft 41. An enlarged portion 64 of the member 62 extends freely into an annular chamber 65 of the driving pulley 47. Within the chamber 65 is a spiral clock spring 68 having its opposite ends secured as indicated at 69 and 70 to the inner and outer peripheries of the pulley 47 and the member 62. The spring 68 is coiled in a clockwise direction (Fig. 3). Threadedly secured to the right side of the pulley 47 is a dust cap 71 for the chamber 65 of the pulley 47, the cap freely surrounding the member 62. Directly connected to the shaft 41 is a stall torque electric motor 72 (Fig. 1), the motor serving to rotate the shaft in a clockwise direction as indicated by the arrow in Fig. 3. The rotation of the shaft 41 by the motor 72 tends to continually wind the spring 68 to a predetermined tension upon resistance being offered to the movement of the belt 49 when one of the lugs 52 is engaged with a rod 13 abutting the stop 23, whereupon the motor stalls. Upon the resistance to the movement of the belt 49 being removed the spring 68 partially unwinds and causes a rapid accelerated travel of the belt, after which the motor 72 again rotates the shaft 41 to again wind the spring as before.

In the operation of the above described rod feeding mechanism a supply of rods 13 or other articles are placed in the chamber 39 of the magazine 30, as shown in Figs. 2 and 3, the lowermost rod resting by gravity on the endless metallic belt 49. In the case of rods or tubes of small diameter which are likely to curl and not lie horizontal in the chamber 39, particularly when the supply of rods in the magazine is low, a suitable weight (not shown) may be inserted in the chamber to bear downwardly upon the rods. In the particular application of the present invention the cutting off machine 12 is set in motion and the chuck 17 and the saw 25 thereof are operated in timed relation to cause successive rods 13 fed thereto to be cut into sections of predetermined lengths. The stall torque motor 72, which is directly connected to the member 62, is set in operation, thereby winding the spiral spring 68 in a clockwise direction and finally imparting motion to the pulley 47 in a similar direction. This causes the upper length of the belt 49 to travel toward the right and the first of the lugs 52 attached to the belt which enters the magazine chamber 39 at the left end thereof (Figs. 1 and 3) will engage the corresponding end surface of the lowermost rod 13 resting on the belt and positively move the rod from the chamber 39 through the rod guiding spindle 14 and towards the positioning stop 23 of the cutting off machine. If the chuck 17 is not opened at this particular moment to permit the rod to move into abutting relation with the positioning stop 23 the stall torque motor continues to operate until the spring is wound to a predetermined tension, with the result that the spring 68 is kept wound tightly, the resistance effective to cause the spring to be wound being obtained by the belt lug 52 continually urging the rod endwise through the closed chuck 17.

When the chuck 17 opens the resistance to the movement of the rod 13 is removed and the energy stored in the spring 68 immediately acts to rotate the attached pulley 47 which causes the belt 49 carrying the lug 52 abutting the left end of the rod to travel rapidly and force the right end of the rod into abutting relation with the stop 23. In the continued operation of the cutting off machine 12 the chuck 17 is closed and thereafter the revolving saw 25 is moved into cutting relation with the rod 13. Upon the rod 13 being severed the saw 25 is retracted which permits the severed length of rod 13 to drop into a container (not shown) or it may be removed in any suitable manner. Immediately thereafter the chuck 17 is opened and the energy stored in the spring 68 by the stall torque motor 72 is again released, with the result that the rod 13 is again projected against the stop 23 and in the continued operation of the machine 12 the cycle just described is repeated upon the rod to sever it into sections of predetermined equal lengths.

When the lug 52 which has been advancing the rod 13 intermittently towards the stop 23 reaches the limit of its horizontal travel through the magazine chamber 39 and moves away from the rod, downwardly and around the idler pulley 48, another rod 13 moves by gravity from the chamber 39 onto the belt 49 immediately behind the trailing end of the previous rod 13. Immediately thereafter the second belt lug 52 enters the magazine chamber 39 at the left end thereof and engages the left end of the rod 13 just moved onto the belt 49 and if not already abutting the trailing end of the previous rod it is immediately moved into engagement therewith. Thereafter successive rods 13 are moved from the magazine 30 and are intermittently fed in end to end abutting relation from the magazine to the machine 12, where they are severed into sections of predetermined lengths.

Although the stock 13 shown in the drawing as being transferred from the magazine 39 to the stop 23 consists of rods of circular cross section, it is to be understood that stock in tube form could be handled in the same manner. Also stock having a non-circular cross-section and stock of different cross sectional areas and lengths, dependent upon the articles being of such a nature that they may be magazined, may be handled by providing mechanism of suitable proportions. While a stall motor is preferred for winding the driving spring, any suitable continuous force may be utilized, such for example, as a slipping clutch driven by the associated machine.

It is also obvious that the above described article feeding mechanism can be built for slow or very rapid action, depending upon the strength and inertia built into the elements thereof, and that it may find a wide application for transferring articles in mechanism substantially different from the kind disclosed herein.

It will be understood that the embodiment herein described is merely illustrative of the invention and one application thereof, the invention being limited only by the terms of the appended claims.

What is claimed is:

1. In a mechanism for conveying articles, an endless traveling member for receiving an article, means extending from the periphery of said member for engaging and advancing an article received on said member, tensioned elastic means operatively connected to said member for causing the same to travel, and means tending to continually tension said elastic means for continually urging said member to travel.

2. In a mechanism for intermittently conveying articles, a stop means for the articles conveyed, an endless traveling member for receiving and advancing an article against said stop means, tensional means operatively connected to said member for continually urging the same to travel, and means tending to continually tension said tensional means.

3. In a mechanism for intermittently conveying articles to a machine, a stop means for articles conveyed to the machine, an endless traveling member for receiving and advancing an article against said stop means, tensioned elastic means operatively connected to said member for causing the same to travel, and means tending to continually tension said elastic means for continually urging said member to travel.

4. In a mechanism for intermittently feeding articles to a machine, a stop means for articles fed to the machine, an endless traveling member for receiving and supporting articles, means carried by said member engageable with successive articles received by said member for advancing the same in end to end abutting relation to said stop means, a tensioned spring operatively connected to said member for continually urging said member and said means carried thereby to travel for advancing the articles and holding the leading end of the foremost article against said stop means, and a stall torque motor operatively connected to said spring tending to continually tension said spring.

5. In a mechanism for intermittently feeding articles to a machine, a stop means for articles fed to the machine, a magazine for containing a supply of articles, a traveling belt for receiving and advancing articles successively from said magazine against said stop means, means including a tensioned spring operatively connected to said belt for continually urging said belt to travel for advancing the article and holding it against said stop means, and means tending to continually tension said spring.

6. In a mechanism for intermittently feeding articles to a machine, a stop means for articles fed to the machine, a magazine containing a supply of articles, a traveling belt for receiving and supporting articles from said magazine, lugs carried by said belt engageable with successive articles for advancing the same against said stop means, driving and idler pulleys around which said belt extends, a tensioned elastic member operatively connected to said driving pulley for rotating the same to cause said belt and the lugs carried thereby to travel for advancing the articles and holding the leading end of the foremost article against said stop means, and means tending to continually tension said member.

7. In a mechanism for intermittently feeding articles to a machine, a stop means for articles fed to the machine, a traveling belt for receiving and supporting an article, means carried by said belt engageable with the article for advancing the same against said stop means, means including a wound spiral spring operatively connected to said belt for effecting a quick travel of said belt when the advanced article is removed from said stop means, and a stall torque motor operatively connected to said spring tending to continually wind the same to a predetermined tension.

8. In a mechanism for intermittently advancing stock to a machine, means for stopping the stock upon a predetermined advance, means for supporting and advancing successive lengths of stock in end to end abutting relation against said stopping means including an endless traveling member, driving and idler pulleys around which said endless member extends, a tensional spiral spring having one end operatively connected to said driving pulley for rotating the same, and a stall torque motor operatively connected to the opposite end of said spring tending to continually tension said spring.

9. In a mechanism for transferring articles or the like, an endless carrier for receiving the article, means for driving said carrier, and means for stopping motion at times of said carrier against the force of said driving means, said driving means comprising a spring and a source of power of predetermined force tending continuously to wind up said spring.

10. In a mechanism for transferring articles or the like, an endless traveling carrier for receiving an article, driving means for continually urging said carrier to travel in one direction, and means for stopping motion at times of said carrier against the force of said driving means, said driving means comprising a spring and a stall torque motor having a predetermined driving force tending continuously to wind up said spring.

11. In a mechanism for intermittently feeding articles to a machine, a stop means for articles fed to the machine, a magazine for containing a supply of articles, an elongated carrier for receiving and advancing articles successively from said magazine against said stop means, said carrier having a plurality of abutments for successively engaging the respective articles, tensioned elastic means operatively connected to said member for causing the same to travel, and means tending to continually tension said elastic means for continually urging said member to travel.

CLARENCE E. McCOY.